United States Patent [19]

Simon-Kochloffel

[11] 4,082,173
[45] Apr. 4, 1978

[54] DRIVE UNIT FOR AN ENDLESS CONVEYOR

[75] Inventor: Arnulf Ivan Simon-Kochloffel, Hillside, N.J.

[73] Assignee: Otis Elevator Company, New York, N.Y.

[21] Appl. No.: 694,865

[22] Filed: Jun. 10, 1976

[51] Int. Cl.$^2$ ............................................. B61B 13/14
[52] U.S. Cl. ................................... 198/330; 198/833; 74/245 S
[58] Field of Search ............... 198/330, 321, 333, 833; 104/25, 172 B, 172 C; 74/245 S, 250 S

[56] References Cited

U.S. PATENT DOCUMENTS

| | | | |
|---|---|---|---|
| 1,956,942 | 5/1934 | Belcher et al. | 74/245 S |
| 1,960,719 | 5/1934 | Stibbs | 198/833 |
| 2,609,086 | 9/1952 | McBride et al. | 198/833 |
| 2,848,102 | 8/1958 | Whitney | 198/833 |
| 3,033,353 | 5/1962 | Burnett et al. | 198/833 |
| 3,498,445 | 3/1970 | Piper | 198/833 |
| 3,677,388 | 7/1972 | Boltrek et al. | 198/330 |
| 3,777,877 | 12/1973 | Piper | 198/833 |
| 3,877,567 | 4/1975 | Sommerfield | 198/833 |
| 3,980,173 | 9/1976 | Riggs | 74/245 S |
| 3,994,390 | 11/1976 | Peterson, Jr. et al. | 198/833 |

FOREIGN PATENT DOCUMENTS

| | | | |
|---|---|---|---|
| 443,581 | 7/1912 | France | 74/250 S |
| 630,499 | 5/1936 | Germany | 198/833 |
| 1,178,100 | 2/1961 | Germany | 104/172 C |
| 2,252,763 | 10/1972 | Germany | 198/330 |
| 780,808 | 8/1954 | United Kingdom | 198/833 |
| 757,867 | 9/1956 | United Kingdom | 198/833 |

Primary Examiner—Evon C. Blunk
Assistant Examiner—Richard K. Thomson
Attorney, Agent, or Firm—Robert T. Mayer

[57] ABSTRACT

A drive unit having a toothed endless member for driving a conveyor. The drive unit includes an endless driving chain having tooth-like projections extending outwardly from the driving chain, each tooth-like projection having a bearing surface which coacts with the toothed side of the endless member to drive the endless member in response to movement of the driving chain. The driving chain engages a pair of sprockets to be moved around each in response to the rotation of one of the sprockets by a drive motor. Each tooth-like projection is inserted into or removed from a respective groove defined by the teeth of the endless member when that tooth-like projection is advanced around a circular path defined by the endless chain driven around one of the sprockets. During its transfer from the circular path to a linear path of travel between the sprockets the bearing surface of each tooth-like projection is urged into bearing against the forward tooth of the endless member defining the respective groove in which its tooth-like projection is inserted. A load support section disposed between the sprockets coacts with the drive chain to maintain their bearing surfaces in bearing with the teeth of the endless member as the bearing elements are advanced between the sprockets.

15 Claims, 10 Drawing Figures

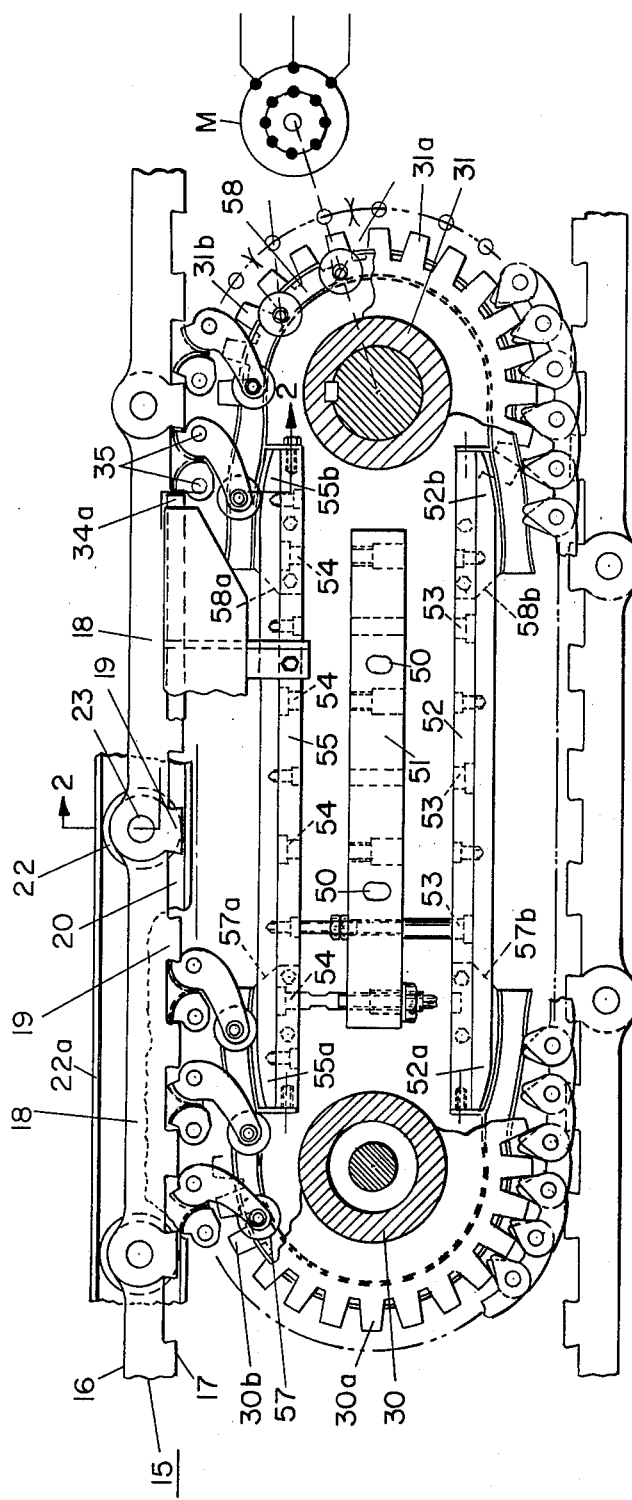
FIG. 1
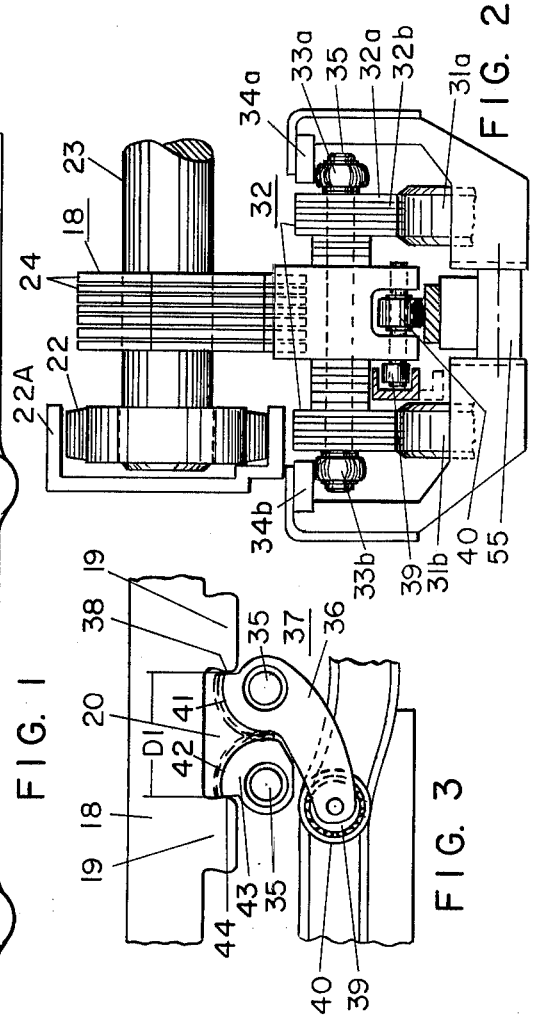
FIG. 2
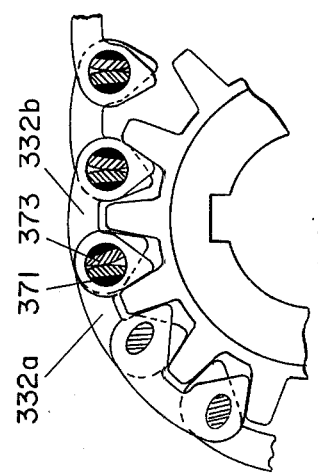
FIG. 10
FIG. 3

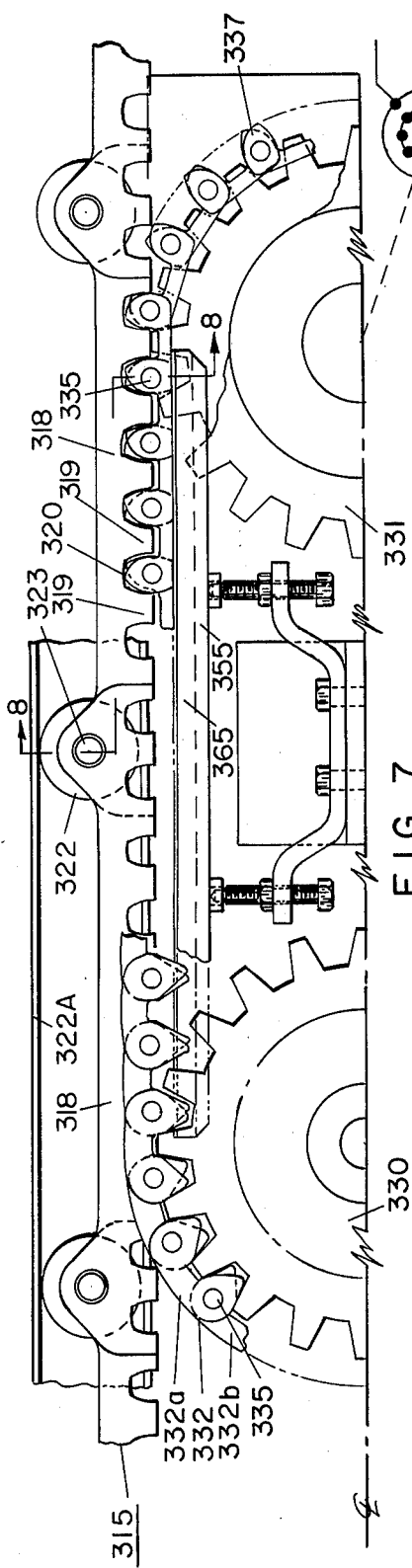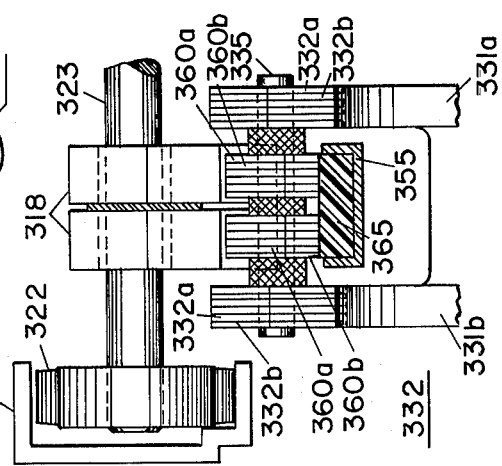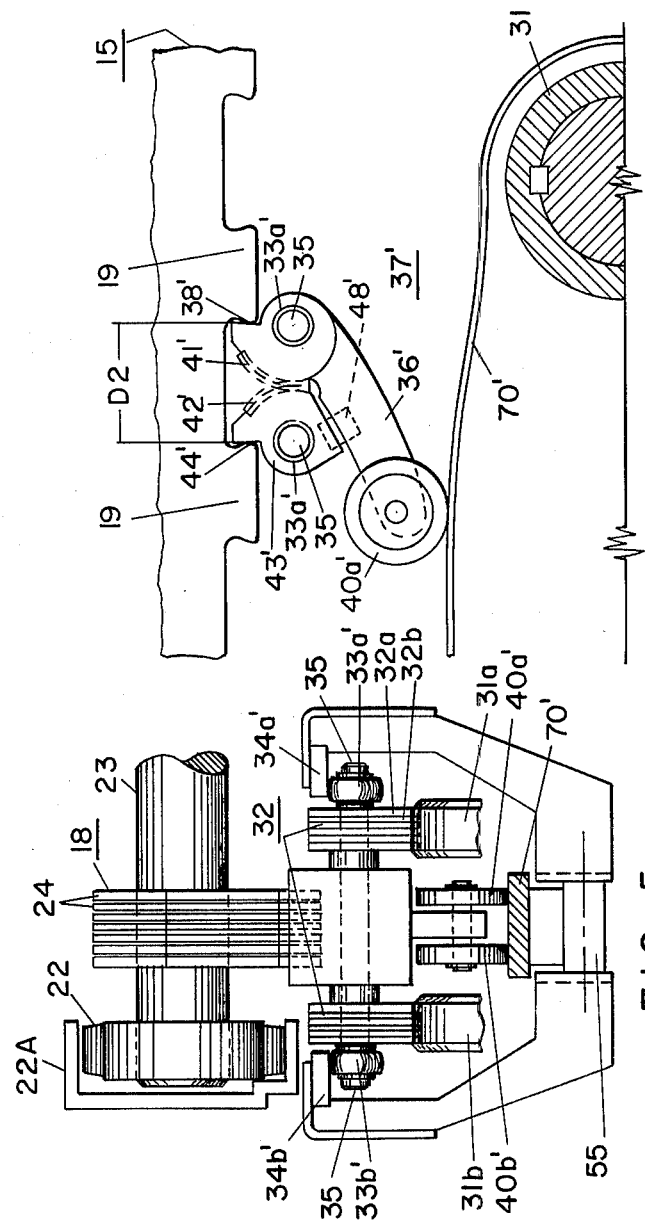
FIG. 8
FIG. 7
FIG. 6
FIG. 5

DRIVE UNIT FOR AN ENDLESS CONVEYOR

This invention relates to endless conveyors and more particularly to a drive unit for such conveyors, especially passenger conveyors of the moving walk or moving stairway variety.

This particular invention was devised for use in a moving stairway although, as will be evident, it is equally useful as a drive unit for a moving walk. Among the various types of drive units for moving stairways that have been proposed in the past is the so-called step chain drive in which one or more chains are connected to each step and extend the entire length of the stairway. Each chain is driven by a motor driven sprocket wheel. With such an arrangement, increases in the rise of stairways demand corresponding increases in the size of the step chain and the size of the motor to accommodate the increased load. Because of this, this arrangement, as do all single motor drive units, becomes more and more uneconomical as the rise is increased.

Another proposal suggests the use of a timing belt. This suffers from the same shortcoming as the step chain drive arrangement does insofar as the size of the motor increasing with increased rise is concerned. Furthermore, it is impractical to design timing belts capable of withstanding tensile forces of 25,000 lbs., (11,350 Kg.), such as would be encountered in moving stairway installations.

Rack and pinion arrangements were proposed very early in the development of the moving stairway. In these arrangements, the endless member was provided with teeth and served as the rack and the pinion drove this member on both its upper and lower runs. Such arrangements cannot accommodate high loads as are encountered in high rise stairways since no more than two teeth can transmit power simultaneously.

It has been suggested to substitute roller chains for the pinions to improve the preceding arrangement. These suggestions have proven less than ideal, however. The rollers can be subjected to severe pressures during initial engagement and disengagement with the rack. To avoid this, the engagement and disengagement operations are performed gradually. This, however, increases the length of the active portion of the drive chain and the length of the slider bed upon which that portion is supported and urged into engagement with the rack on the endless member. As is evident, increased wear results from such increases.

It has also been proposed to employ resilient rollers to reduce the engagement and disengagement pressures and to eliminate the slider bed for employing racks with teeth that have a negative slant whereby the distance between the flanks of adjacent teeth is greater at their roots than at their crowns. This requires the rollers to be squeezed into and out of each groove between adjacent teeth and subjects them to the consequent wear attendant these actions.

It is an object of the invention to provide an improved drive unit for an endless conveyor.

It is another object of the invention to provide a drive unit for an endless conveyor which utilizes a plurality of teeth to transmit the moving force between the drive member and the driven member.

It is another object of the invention to reduce the length of travel required for the engagement or disengagement of the drive and driven members.

A further object of the invention is to reduce wear in the contact area between the drive and driven members.

A still further object of the invention is to reduce or eliminate the effects of backlash between the drive and driven members.

In carrying out the invention, a drive unit is provided for an endless conveyor which is supported on a structural member and has an endless member with a load bearing side and a non-load bearing side which extends over a predetermined path. The non-load bearing side of the endless member is provided with teeth and has grooves between adjacent teeth. The drive unit includes two pairs of sprocket wheels, one pair mounted adjacent the other on opposite sides of the structural member between its ends in such a way that the sprocket wheels of each pair are displayed from each other along the predetermined path of the endless member. Each sprocket wheel has two axially separated rows of teeth and one sprocket wheel of each pair is driven by a motor supported on the structural truss. A pair of endless driving chains is provided each having first bearing elements comprising sets of links joined together by link pins fashioning endless loops of a double stranded chain. Each driving chain cooperates with one of the pairs of sprocket wheels engaging both of the axially separated rows of teeth of each associated sprocket wheel to be driven around each by the motor driven sprocket wheel. Second bearing elements are pivotally mounted on the link pins of each driving chain between its links. These second elements pass adjacent the teeth of their associated sprocket wheels as their link pins are driven around those wheels. Each of these second bearing elements includes a tooth-like projection which extends outwardly from the driving chain and which is positioned to be inserted into or removed from a respective groove in said endless member when the bearing element is advanced around a circular path adjacent the teeth of each sprocket wheels. As each of the second bearing elements advances from the circular path defined by the chain as it is driven around each sprocket wheel to the linear path between the sprockets its outwardly projection portion having a bearing surface is inserted into a respective groove in the endless member and its bearing surface is urged into bearing against that tooth of the endless member which is the forward one in the direction of travel of the two teeth which define the groove in which the outwardly projecting portion is inserted. Guidance means supported by the structural member and disposed between each pair of sprockets guide and maintain the bearing surfaces of the second bearing elements in the respective grooves in the endless member as they are advanced between the sprockets.

Features, advantages and other objects of the invention will be apparent from the following description and appended claims when considered in conjunction with the accompanying drawing, in which:

FIG. 1 is a sectional view in elevation with parts removed of one embodiment of the invention;

FIG. 2 is a sectional view in elevation of parts of FIG. 1 taken along line 2—2;

FIG. 3 is an exloded front view of parts of the preferred embodiment of FIG. 1;

FIG. 5 is a sectional view in elevation of a second arrangement of parts of the apparatus of the invention shown in FIG. 2;

FIG. 6 is an exploded front view of parts of the alternate arrangement of the invention shown in FIG. 5 and a portion of an endless track;

FIG. 7 is a partial sectional view in elevation with parts removed of an alternate embodiment of the invention;

FIG. 8 is a sectional view in elevation of parts of FIG. 7 taken along line 8—8;

FIG. 10 is an exploded view in elevation of parts of the alternate embodiment of FIG. 7.

Figure 4:
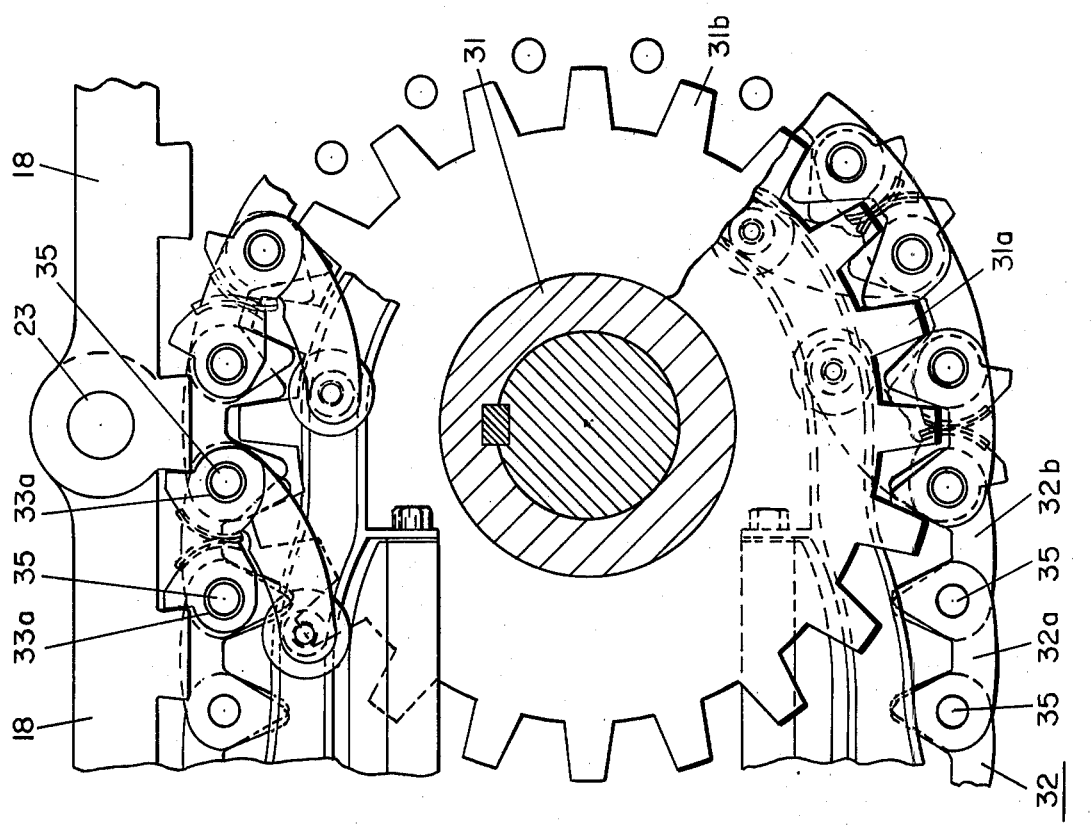
FIG. 4 is a fragmentary explosed view of the drive sprocket illustrated in FIG. 1 with parts removed and/or cut away.

In FIG. 1 a drive unit embodying the invention and adapted for use with a suitable endless conveyor is illustrated. The conveyor, as is typical, is supported on a structural member (not shown) in any well-known manner. The drive unit includes endless member 15 having load bearing side 16 and non-load bearing side 17 opposite thereof. Mounted on the endless member in any suitable manner may be steps of a moving stairway or platforms of a moving walk. In the embodiment shown in FIG. 1, endless member 15 is disclosed as a conveyor chain made up of a series of articulated links 18, although other suitable configurations would be just as satisfactory. On the non-load bearing side of each of links 18 a plurality of teeth 19 are formed with each two adjacent teeth defining a groove 20 therebetween. Although not presently considered necessary, it is desirable that teeth 19 have a slight negative slant; i.e. that the groove between adjacent teeth be wider at the roots of the teeth than at their crowns. A 4° negative slant is presently considered suitable.

As shown in FIGS. 1 and 2, each of conveyor chain links 18 is supported by a conveyor chain wheel 22, each of which is rotatably mounted on an axle 23 for rolling motion on guide tracks 22A supported on the forementioned structural member in any suitable well-known manner. Each chain link 18 is fabricated of laminated steel sections 24 which are rotatably mounted on their respective axle 23. Although not shown in the drawing, it is to be understood that the arrangement disclosed is preferably symmetrical about the mid-point of longitudinal axis of axle 23. Consequently only one of the drive units will be described it being understood that the description applies to a second symmetrical drive unit disposed parallel to the one illustrated in FIG. 1.

Endless member 15 travels a predetermined closed path, on one run of which its load bearing side 16 is capable of supporting loads. The other run is a non-load supporting return run. Disposed between these runs on each side of the mid-point of axle 23 as illustrated in FIG. 1 is a drive unit comprising a chain drive assembly, including a pair of sprocket wheel 30 and 31 (FIG. 1). The sprocket wheels are mounted on the forementioned structural member in any suitable manner so as to be displaced from each other along the path of endless member 15. Sprocket wheel 31 is driven by a suitable motor M (FIG. 1) such as an a-c induction squirrel cage type mounted on the forementioned structural member in any suitable manner. Each sprocket wheel is formed with two axially displaced rows of teeth, e.g. teeth 31a, 31b (FIGS. 2 and 4) of sprocket wheel 31. A single double stranded endless drive chain 32 is fabricated of pairs of interleaved laminated steel sections 32a and 32b (FIGS. 2 and 4) to form first bearing elements which engage the axially displaced rows of teeth of each sprocket wheel of the drive assembly to be driven around both spocket wheels by the motor driven one. As shown in FIGS. 1, 2 and 4 each interleaved laminated section or link is pivotally mounted on pairs of link pins 35 forming a single endless chain 32 with a double strand of links of the well-known silent chain type of construction. As shown in FIG. 1 and more clearly in FIG. 2 a pair of reactive thrust rollers 33a and 33b are mounted on each link pin 35 for rolling engagement with reactive members 34a and 34b supported in a manner to be described hereinafter. Although the silent chain construction is preferred for use with this embodiment of the invention it is understood that other types of chain constructions such as the roller type are also useful for this embodiment.

Pivotally mounted on each alternate link pin 35 of endless drive chain 32, is a drive cam 36 (FIGS. 1 and 3) having a first tooth-like projection extending outwardly from the chain link pin forming part of a second bearing element (FIGS. 3 and 4). Each tooth-like projection has a bearing surface 38 extending from one end of each drive cam toward the outer periphery of the driving chain for engagement with teeth 19 of the conveyor chain links as shown in FIGS. 1, 3 and 4. At the other end of each of drive cams 36 is rotatably mounted a side guide roller 39 (FIG. 2) and a clamping guide roller 40 (FIGS. 1, 2 and 3). Each side guide roller 39 may suitably be fabricated of nylon; whereas, clamping guide roller 40 is desirably more resilient and suitably includes a polyurethane tire with constant spring characteristics.

At the same end of each drive cam 36 as bearing surface 38 is a suitable toothed sector 41 (FIG. 3) of a spur gear. In mating engagement with the toothed sector 41 of each drive cam 36 is a corresponding toothed sector 42 of another spur gear formed in idler cam 43. The idler cam 43 is pivotally mounted on each link pin 35 of endless driving chain 32 adjacent one of the alternate link pins on which drive cam 36 is mounted. At one side of the toothed sector 42 of each idler cam 43 there is formed a second tooth-like projection having a second bearing surface 44 also projecting from its associated link pin towards the outer periphery of the driving chain and disposed in an opposed relationship to the first bearing surface for engagement with teeth 19 of conveyor chain links 18. As shown in FIG. 3 second bearing surface 44 is disposed in an opposed relationship to first bearing surface 38 and a distance D1 therefrom. This separation distance D1 is variable and is reduced by rotating drive cam 36 around its associated driving chain link pin in a counter-clockwise direction as viewed in FIG. 3.

Mounted on the forementioned structural member on each side of the centerline of axle 23 in any suitable manner, such as by being bolted thereto by means of mounting slots 50 (FIG. 1), is a guidance means including a track support bar 51. Supported from each support bar 51 by means of three bolts 53 is a lower linear track section 52 hereinreferred to as the second load support section which may be suitably fabricated of steel bar sections. Four bolts 54 adjustably support a similarly fabricated upper linear track section 55 or first load support section from each support bar 51. As mentioned previously a pair of reactive thrust rollers 33a and 33b are mounted on each chain link pin 35 or the endless chain for rolling engagement with reactive members 34a and 34b. Reactive members 34a and 34b are supported by upper linear track section 55 in any suitable manner (FIG. 2). It is understood that although not shown another pair of reactive members are suitably mounted on lower linear track section 52. The aforementioned adjustable mounting of track sections 52 and 55 enables the load support track section 55 to be moved with relationship to its respective second load support track section 52 for ease of installation. Slots 50 enable each pair of load support track sections to be moved as a unit with relationship to the two runs of endless member 15.

Except for each end of each load support section 52 and 55 which terminates in an inclined portion 52a, 52b, 55a and 55b, each section is desirably disposed parallel to the run of endless member 15 of which it is adjacent. Fastened to the ends of each pair of the load support sections are arcuate track sections 57 and 58 suitably fabricated of channel steel sections. A suitable means of fastening is by bolting each end of each arcuate section by means of straps 57b, 58b, 57a, 58a to the ends of the load support sections 52 and 55 so that the ends of the arcuate sections and the inclined portions 52a, 52b, 55a, 55b overlap in the manner shown in FIG. 1. Each arcuate section is adjacent the circumferential periphery of an associated one of the sprocket wheels 30 or 31. The arcuate and load support track sections including the inclined portions thereof, together with the guide unit of each drive cam comprising side and clamping guide rollers 39 and 40, form part of the guidance means referred to herein.

To facilitate an understanding of the operation of the drive unit of FIG. 1, assume endless member 15 is being driven from the left to the right of FIG. 1 of the drawing on its load supporting run above the sprocket wheels. Under these conditions, each of sprocket wheels 30 and 31 and their counterparts in the chain drive assembly on the other side of the drive unit are rotating clockwise as viewed in FIG. 1. Shortly before clamping guide roller 40 of each drive cam 36 rolls off that portion of first load support section 55 which is parallel to the load run of endless member 15, the associated side guide roller 39 enters the overlapping portion of arcuate track section 58. Likewise, the counterparts in the other chain drive assembly on the other side of the drive unit operate in a similar manner. Since this is so for all of the operations of the drive unit, the operation of these counterparts of those elements of the chain drive assembly shown in FIG. 1 will hereinafter be disregarded for the remainder of this explanation.

The movement of each side guide roller 39 over arcuate track section 58, together with the movement of clamping guide roller 40 over the overlapping inclined portion 55b of load support section 55, causes the toothed sectors of the corresponding spur gears 41 and 42 to rotate in the counter-clockwise and clockwise directions respectively, as viewed in FIG. 1. This reduces the separation distance D1 between the opposed bearing surfaces, disengages bearing surfaces 38 and 44 from the teeth 19 against which they were bearing and positions their associated tooth-like projections to be removed from the groove 20 in which they were positioned as side guide roller 39 is advanced around a circular portion of arcuate track section 58. With movement of drive chain 32 around sprocket wheel 31, each drive cam 36 is guided around the periphery of the sprocket wheel by arcuate track section 58. This maintains the bearing surfaces 38 and 44 properly oriented to be inserted into another groove 20 and urged into bearing against another tooth 19 upon its side guide roller 39 encountering the overlapping portion of arcuate track section 58 and its clamping guide roller 40 engaging the inclined portion 52b of linear track section 52. As is evident the tooth 19 against which the drive cam's bearing surface 38 bears is that tooth which is the forward one in the direction of travel of the two teeth defining the groove in which the bearing surface is positioned. As the bearing surface 38 of a drive cam 36 is urged into bearing against such a forward tooth, the rotation of cam 36 is transmitted to its associated idler cam 43 through their respective toothed sectors and the bearing surface 44 of the idler cam is urged into bearing against the trailing tooth of the groove in which the tooth-like projections of the drive and idler cams have been inserted. It is understood that as the clamping guide rollers of each drive cam moves along the inclined portion 52b of linear track section 52 the reactive members (not shown but similar to reactive members 33a and 33b, FIGS. 1 and 2) supported by linear track section 52 engage the reactive thrust rollers 33a and 33b associated with the chain link pin supporting the drive cam. The bearing surfaces 38 and 44 are maintained in this clamped position in transit between sprocket wheels 31 and 30 by the movement of their associated clamping guide roller 40 on second load support track section 52 until that roller encounters the inclined portion 52a and the associated side guide roller 39 encounters the overlapping portion of arcuate track section 57 whereupon the bearing surfaces 38 and 44 of drive and idler cams are both disengaged from the teeth against which they were bearing and subsequently withdrawn from the groove in the manner explained previously in connection with a drive cam encountering the inclined portion 55b of the load support track section 55.

With the embodiment of FIG. 1, wear of drive chain 32 which produces elongation therein can easily be taken up by adjusting the track system without affecting the capacity of the drive unit to transmit power to endless member 15 since the clamping force of the drive and idler cams within the limits of adjustment of the track system is independent of the length of the drive chain.

An alternate arrangement of the guidance means comprising second bearing element 37 and the arcuate and linear track sections described above is shown in FIGS. 5 and 6. Except for the bearing elements and track sections this alternate arrangement is the same as the drive unit described above. Consequently references made in the following description to those parts common to both arrangements will employ the same reference characters as used above. The parts of the alternate arrangement of the guidance means to be described are identified in FIGS. 5 and 6 and in the following description by the same reference characters as utilized previously to identify the first arrangement of the guidance means except that these reference characters carry a prime symbol in this alternate arrangement.

Each second bearing element 37' shown in FIG. 6 comprises a drive cam 36' pivotally mounted on each alternate link pin 35 of the endless drive chain shown in FIG. 1. One end of each drive cam 36' has a tooth-like projection extending outwardly from the driving chain. A first bearing surface 38' and a toothed sector 41' of a spur gear are formed thereon in the manner of each drive cam 36 of the first embodiment. This alternate arrangement also includes an idler cam 43' having an outwardly extending tooth-like projection including a toothed sector 42' of a spur gear corresponding to and in mating engagement with the toothed sector 41' of drive cam 36'. Additionally, the tooth-like projection of each idler cam 43' has a second bearing surface 44' disposed in an opposed relation to the first bearing surface and at a variable separation distance D2 therefrom. As shown in FIG. 6 the variable separation distance D2 between the opposed bearing surfaces 38' and 44' has been extended so that each bearing surface engages teeth 19 of endless member 15. Each idler cam is shown pivotally mounted on each alternate link pin 35 of the endless drive chain adjacent each link pin on which its mating drive cam 36' is mounted. A biasing means such as a compression spring, leaf spring or a suitable piece of elastic material is shown in FIG. 6 as a resilient member 48' positioned between each idler cam 43' and drive cam 36'.

A pair of clamping guide rollers 40a' and 40b' (FIG. 5) is rotatably mounted on the end of each drive cam 36' opposite the associated toothed sector 41'. The clamping guide rollers 40a' and 40b' are formed of a suitable polyurethane material and are biased by the resilient member 48' into continuous rolling engagement with an endless track 70' (FIGS. 5 and 6).

Endless track 70' (FIG. 5) is suitably supported from support bar 51 and comprises a first load support track section and a second load support track section (not shown) each of which is disposed parallel to the run of endless member 15 in a manner similar to sections 52 and 55 of the first described arrangement of the guidance means. As in the previous arrangement reactive members 34a' and 34b' (FIG. 5) are suitably supported by a first load support track section similar to track section 55 of the first arrangement for engagement with reactive thrust rollers 33a' and 34b' mounted on each end of chain link pin 35 as shown in FIG. 5. Endless track 70' (FIG. 6) also includes a pair of arcuate track sections and disposed adjacent the circumferential periphery of each of the sprocket wheels in a manner similar to sections 57 and 58 of the first described arrangement of the guidance means. Joining the linear and arcuate section of track 70' to form it into an endless member are inclined portions similar to those portions 52a, 52b, 55a and 55b of the first described arrangement of the guidance means. Each of the sections of the endless track 70' are fabricated of channel steel or other suitably structural supports of sufficient width to bear against the pair of clamping guide rollers 40a' and 40b' of the drive cam 36'.

The operation of this alternate arrangement of the guidance means is similar to that described above for the first described arrangement of the guidance means. A brief description of the removal of the bearing surfaces 38' and 44' from a groove of the endless member will be presented as if this arrangement of the guidance means was substituted in FIG. 1. It will be understood from this how the bearing surfaces of each of the tooth-like projections of the drive and idler cams are positioned to be inserted into or removed from the grooves of the endless member and how their bearing surfaces are maintained in bearing against the teeth of the endless member defining those grooves.

Assume that the sprocket wheels as viewed in FIG. 1 are rotated in a clockwise direction. As a result the drive chain 32 drives the upper run of endless member 15 from the left to the right of FIG. 1. It is to be understood that as the drive camm 36' and its associated idler cam 43' move along the linear portion of the endless track section their tooth-like projections are positioned within one of the grooves 20 formed between the teeth 19 of the endless member and their associated bearing surfaces 38' and 44' are maintained in bearing against those teeth as illustrated in FIG. 6. It is also to be understood that the resilient member 48' maintains clamping guide roller 40a' and 40b' in continuous rolling engagement with track 70' throughout their travel around that track. As the clamping guide rollers 40a' and 40b' pass from the linear portion of the first load support track section onto its inclined portion the resilient member 48' biases the clamping guide rollers into continuous engagement with the track and as a result the drive cam 36' rotates in a counter-clockwise direction around the link pin 35 on which it is mounted thereby causing a clockwise rotation of its mating idler cam 43'. As a result the separation distance D2 between the opposed bearing surfaces 38' and 44' of the drive and idler cams 36' and 43' is reduced disengaging them from teeth 19 against which they were bearing. Subsequently the tooth-like projections of the drive and idler cams are removed from the groove formed between the teeth of the endless member as they are advanced round the arcuate section of the endless track.

An alternate embodiment of the drive unit of this invention is illustrated in FIGS. 7, 8, 9 and 10. It employs a different second bearing element than the embodiment of FIG. 1 for the transmission of motion from the drive chain to the endless member and a different track system for the guidance means. The parts of the apparatus of this embodiment of the invention are identified by a sequence of reference numerals of the three hundred series. Where possible those parts of the apparatus of this embodiment having a similar function to parts of the apparatus of the first embodiment are identified by the same reference numerals of the three hundred series as the reference numerals used to identify those parts of the apparatus of the first embodiment of the invention.

Figure 9:
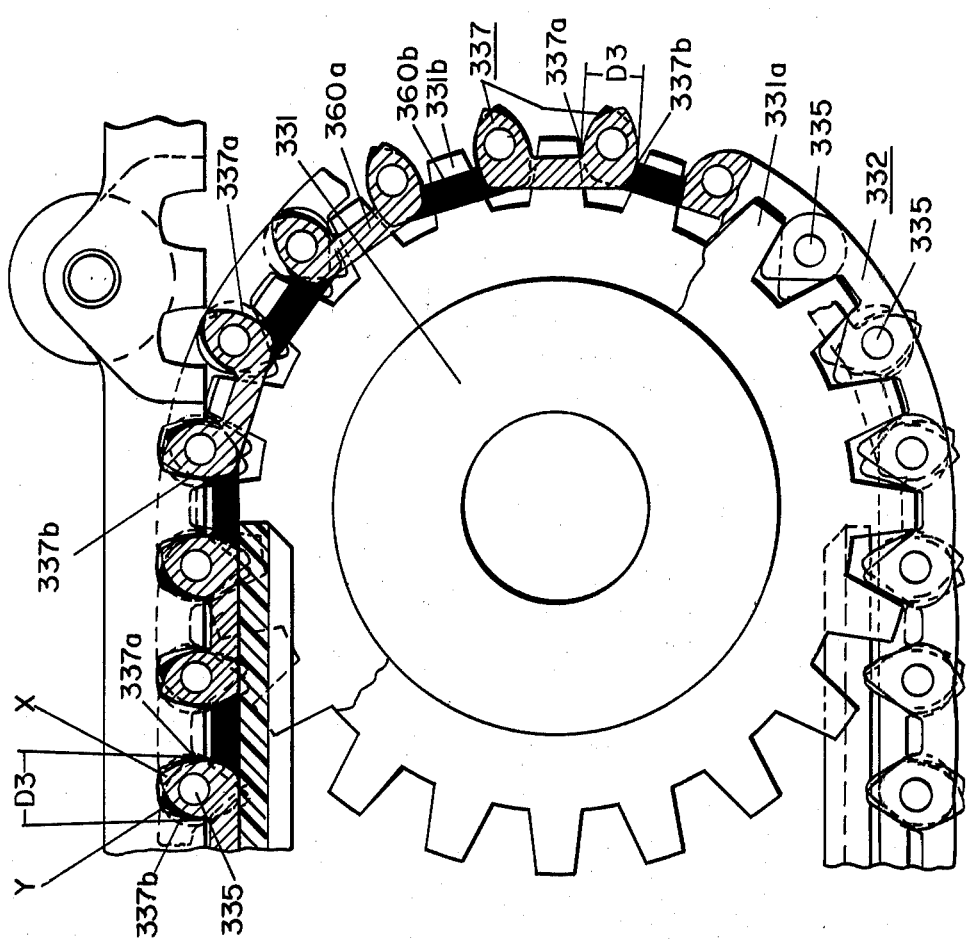
FIG. 9 is a fragmentary exploded view of the drive sprocket illustrated in FIG. 7 with parts removed and/or cut away.

Shown in FIGS. 7, 8 and 9 is an endless driving chain 332 having parallel sets of sprocket engaging interleaved primary chain links 332a and 332b joined together by link pins 335. Each of the sprocket engaging chain links is pivotally mounted on two adjacent link pins (FIG. 9) constructing a single endless driving chain having a double strand of sprocket engaging teeth of the well-known silent chain variety.

Second bearing elements 337, shown more clearly in the cutaway views of FIGS. 8 and 9, comprising a plurality of interleaved secondary chain links 360a and 360b are mounted adjacent the sets of primary chain links and are also pivotally mounted on pairs of adjacent link pins of the double stranded silent chain. As shown each of the secondary chain links has a pair of tooth-like projections extending in a direction substantially opposite to the sprocket engaging teeth of the primary links. Each of the tooth-like projections has a bearing surface and as shown each secondary chain link is provided with a first bearing surface 337a and a second bearing surface 337b. The first bearing surfaces of one set of secondary chain links and the second bearing surfaces of their adjacent interleaved chain links mounted on the same chain link pin form opposed bearing surfaces of a single tooth-like projection having a variable separation distance D3 therebetween. The separation distance D3 between the opposed bearing surfaces is varied by the movement of their associated chain link as they are advanced along a path defined by the endless chain driven around and between a pair of sprockets 330 nad 331 (FIG. 7).

Each of the sets of primary chain links of the endless driving chain engages sprocket wheels 330 and 331 (FIGS. 7, and 9) each having a double row of axially displaced teeth 331a and 331b as in the FIG. 1 embodiment. A drive motor M1 (FIG. 7) of the a-c induction squirrel cage type is mounted on the forementioned structural member (not shown) and is connected to the drive sprocket 331. The drive unit of this embodiment is also symmetrical about the centerline of the conveyor chain axle 323 and comprises two identical chain drive assemblies. Each chain drive assembly is itself symmetrical about a line through the centers of the sprocket wheels 330 and 331 and consequently only one-half an assembly is illustrated in FIG. 7.

As shown in FIGS. 7 and 9, the guidance means of the embodiment differs from that of FIG. 1 in that no arcuate track sections are used. Also, the lower and upper linear track sections 352 and 355 hereinafter referred to as first and second load support sections respectively, disposed between the sprocket wheels differ in that there is no roller guide on the driving chain to engage the tracks. Consequently, a resilient material 365 as illustrated in FIGS. 7 and 9 is bonded in each of the lower and upper linear track sections such as 355 (FIGS. 7 and 9) for the backs of the secondary links 360a and 360b to slide on. Alternatively, it is contemplated that needle bearing rollers may be provided in the channel sections as a suitable substitute for the backs of the secondary links to roll on.

It is to be understood that an additional freedom of motion in excess of that possessed by the driving chain of the FIG. 1 embodiment is preferred in this alternate embodiment. This is provided by employing the dual or split link arrangement shown in FIG. 10. With this arrangement the link laminations of both the primary and secondary driving chain links (332 and 360) are alternately keyed or otherwise suitably connected to split pins 371 and 373 in the known manner.

Since each of the secondary links 360a, and 360b of this alternate embodiment are fabricated of laminated sections it is also desirable to provide a solid surface on teeth 319 of conveyor chain links 318 for the bearing surfaces 360a, 360b to bear against. This may be accomplished by bonding such a surface in grooves 320 or by manufacturing links 318 of suitable cast material.

As mentioned above, the separation distance between the opposed bearing surfaces of adjacent interleaved secondary chain links mounted on the same chain link pin is variable. The manner in which the separation distance is varied can be understood with reference to FIG. 7 if it is assumed that drive sprocket 331 is rotating in a clockwise direction as viewed therein. For the purpose of this description consider the pair of alternate adjacent interleaved secondary chain links having their respective tooth-like projections X and Y extending into a groove of the endless member from chain link pin 335 as shown in the upper left hand corner of FIG. 9. The tooth-like projections have opposed bearing surfaces 337a and 337b which are urged into bearing against the two teeth defining the groove in which they are shown inserted. The separation distance D3 between the bearing surfaces 337a and 337b is set by the driving chain extended linearly between the sprockets. Further increases in the separation distance are opposed by the two teeth defining the groove of the endless member in which the tooth-like projections are inserted and the load support section 355 containing the resilient material 365 on which the backs of the secondary chain links slide.

It is understood by reference to FIG. 9 that as the sprocket 331 is rotated in a clockwise direction the selected tooth-like projections X and Y of the secondary chain links are advanced to a position at which their associated chain link pin is engaged by the sprocket. It is obvious that at this position the chain link having the tooth-like projection Y and leading its adjacent interleaved secondary chain link has begun to rotate around the sprocket. As a result the bearing surface of tooth-like projection Y is pivoted away from bearing against the rear tooth defining the groove of the endless member in which it is inserted thereby reducing the separation distance between the opposed bearing surfaces.

It is also obvious from FIG. 9 that as the tooth-like projections X and Y are advanced around the sprocket the second or lagging chain link associated with tooth-like projection X pivots its bearing surface to further reduce the separation distance D3 between the opposed bearing surfaces to remove it from bearing against that tooth which is the forward one of the two teeth defining the groove of endless member. While the separation distance is being reduced the tooth-like projections X and Y of the two adjacent secondary chain links are removed from the groove as the driving chain advances them around the sprocket.

As the secondary chain links are advanced around the sprocket the positioning of the links maintains the separation distance between the opposed bearing surfaces and the tooth-like projections in the contracted state. As a result the tooth-like projections are positioned to be inserted into a groove of the endless member as the chain link pin on which they are supported approaches that portion of its path of travel from which it leaves the sprocket. The tooth-like projections are then inserted into the groove of the endless member as the leading secondary chain link is advanced to the linear path of travel between the sprockets. As the tooth-like projections are being inserted into the groove the leading chain link urges its associated bearing surface Y in bearing against the rear tooth of the two teeth defining the groove in which it is inserted. Subsequently, the lagging secondary chain link upon entering the linear path of travel urges its bearing surface X into bearing against the forward tooth of the same groove. As a result the separation distance between the opposed bearing surfaces is expanded and the bearing surfaces are maintained so positioned by the endless chain and the load support section as their chain links are advanced along the linear path between the sprockets defined by the endless driving chain.

It is understood that as the second bearing elements of the above disclosed embodiments are driven between the sprockets they cooperate to share in the transmission of the driving force applied to the endless member. In the arrangements of the first embodiment the sharing of the transmission of the force applied to the endless member results from the interaction of the resilient tires engaging the upper and lower linear track sections while this sharing of the force results from the cooperation of the resilient material bonded in the upper and lower linear track sections with the backs of the secondary links.

Various other modifications will be apparent to those skilled in the art. It is contemplated, for example, that in some installations it might not be necessary to engage the conveyor chain on both its load supporting and its return runs so that in those circumstances it will be driven only on one of its runs. Also, it might be desirable to utilize only one chain drive assembly mounted to engage the conveyor chain at the middle of its axis instead of the two assemblies disclosed in the embodiments herein.

Various configurations of teeth and grooves of the conveyor chain, driving chain and sprocket wheel, as well as of bearing elements, are also possible. Different pitch relationships between the conveyor chain and the driving chain such as would be provided by employing only half the bearing elements used in the disclosed embodiments are also contemplated. It is understood that in some installations the sets of primary and secondary chain links described in the second embodiment would be replaced by a single set of interleaved adjacent links each chain link having sprocket engaging teeth and tooth-like projections extending in a substantially opposite direction to its sprocket engaging teeth. Each of these chain links are mounted in the same manner as the sets of links of the secondary embodiment. For these reasons, it is to be understood that the specific embodiments disclosed herein are intended to be illustrative and not limiting in any sense.

What is claimed is:

1. For use with an endless conveyor supported on a structural member and having an endless member with a load bearing side and a non-load bearing side opposite thereof extending over a predetermined path, said non-load bearing side having teeth defining grooves between adjacent teeth, a drive unit including:

a pair of sprockets mounted on said structural member between the ends thereof, said sprockets being displaced from each other along said path;

a motor supported on said structural member rotatably driving one of said sprockets; an endless driving chain arrangement including a driving chain comprising chain links joined together by link pins and having first bearing elements engaging each of said sprockets whereby said chain is driven on a circular path around each sprocket and on linear paths between both sprockets by said motor driven sprocket, said endless chain having second bearing elements extending outwardly from said driving chain each comprising a drive cam pivotally mounted on each alternate driving chain link pin adjacent said chain links and having a first tooth-like projection with a first bearing surface, and an idler cam cooperating with each driven cam pivotally mounted on each driving chain link pin adjacent a driving chain link pin on which a drive cam is mounted and having a second tooth-like projection with a second bearing surface, said first and second tooth-like projections of each second bearing element extending outwardly from said driving chain;

said first and second bearing surfaces of said second bearing elements disposed in an opposed relationship forming opposed bearing surfaces having a variable separation distance therebetween, each said separation distance having a first magnitude when said second bearing elements are driven around said circular paths, said first and second tooth-like projections of each second bearing element being inserted into a respective groove in said endless member during their travel on one of said circular paths; and said separation distance being increased to a second magnitude as said second bearing elements are advanced from said one circular path to one of said linear paths to urge said opposed bearing surfaces into bearing against the two opposing teeth defining the groove in which said tooth-like projections are positioned.

2. A drive unit according to claim 1, wherein said endless driving chain arrangement includes guidance means having a first load support section supported by said structural member and disposed between said sprockets, said guidance means supporting said driving chain as it travels along said one of its linear paths and maintaining the opposed bearing surfaces of each cooperating first and second tooth-like projections positioned in a groove in said endless member in bearing against the two teeth defining the associated groove during the travel of said projections along said one linear path 3. A drive unit according to claim 2, wherein each said drive cam has one of said tooth-like projections at one end and a guide unit rotatably mounted at its other end, said guide unit cooperating with said guidance means and maintaining the bearing surfaces of each drive cam and its associated cooperating idler cam in bearing against the teeth of the groove in which they are positioned during travel along said one linear path.

4. A drive unit according to claim 3, wherein said guidance means includes a first arcuate section and a first load support section mounted on said structural member, said first arcuate section being disposed adjacent the circumferential periphery of an associated one of said pair of sprockets, said load support section extending from said arcuate section and being disposed between said pair of sprockets adjacent and substantially parallel to the predetermined path of said endless member, said first arcuate and load support sections cooperating with said guide unit of each of said drive cams to pivot each of said drive cams and its associated idler cam around their associated driving chain link pins so that in advancing from said first arcuate section to said first load support section the tooth-like projections of each set of cooperating drive and idler cams are positioned to be and are inserted into a respective groove in said endless member; said load support section and the guide unit of each drive cam inserted in a groove of said endless member thereafter cooperating to urge the bearing surfaces of each said drive cam and its cooperating idler cam in bearing against the two teeth defining said groove of said endless member in which said cams are inserted.

5. A drive unit according to claim 4, wherein said first load support section includes an inclined portion at its end extending from said arcuate section and a linear portion, said inclined portion overlapping said first arcuate section, said inclined portion cooperating with the guide unit of each drive cam to pivot its associated drive cam and its associated idler cam around their associated driving chain link pins to increase the separation distance between the bearing surfaces of each cooperating cam to said second magnitude to urge said bearing surfaces into bearing against the two teeth defining said respective groove of said endless member in which each set of cooperating cams are positioned.

6. A drive unit according to claim 5, wherein said first arcuate and load support sections of said guidance means are arcuate and linear track sections mounted on said structural member and each said guide unit includes a side guide roller and a clamping guide roller each rotatably mounted on its associated drive cam, each said side guide roller cooperating with said arcuate track section to maintain the separation distance between the bearing surfaces of the associated drive and idler cams at said first magnitude and to guide its associated drive and idler cams so that their tooth-like projections are inserted into a groove of said endless member, each said clamping guide roller engaging said inclined portion of said load support section to increase the separation distance between the bearing surfaces of the associated cooperating drive and idler cams to said second magnitude to urge said bearing surfaces into bearing against the two teeth defining the respective groove of said endless member in which the associated cooperating cams are positioned as said clamping guide roller engages the linear portion of said first load support section positioned between said sprockets.

7. A drive unit according to claim 6, wherein said endless member also extends over a return path of travel parallel to said predetermined path on the diametrically opposite side of said sprockets therefrom and said guidance means includes a second load support section and a second arcuate section disposed in the same relationship to said other sprocket and said return path as said first load support and arcuate track sections are disposed in relationship to said associated one of said sprockets and said predetermined path, each said side guide roller cooperating with said arcuate track sections to guide its associated drive and ilder cams so that their tooth-like projections are inserted into a groove of said endless member, each of said load support sections having an inclined portion at each end and a linear portion therebetween cooperating with said clamping guide roller of each drive cam to increase the separation distance between the bearing surfaces of said cooperating drive and idler cams to said second magnitude to urge said first bearing surfaces into bearing against the teeth of said endless member defining the respective groove in which said associated drive cam and its cooperating idler cam are positioned.

8. A drive unit according to claim 4 wherein said endless member also extends over a return path of travel parallel to said predetermined path of the diametrically opposite sides of said sprockets therefrom and said guidance means includes an endless track mounted on said structural member, said endless track including a pair of arcuate sections each being disposed adjacent the circumferential periphery of an associated one of said pair of sprockets and a pair of load support sections each extending from opposed ends of said pair of arcuate sections and disposed substantially parallel to respective paths of said endless member, 9. A drive unit according to claim 7, wherein each drive cam and its associated idler cam each includes a toothed sector of a spur gear each in mating engagement with the other whereby each idler cam is pivoted on its driving chain link pin when its associated drive cam is pivoted on its driving chain link pin.

10. A drive unit according to claim 9, wherein said first load support section is adjustably mounted with respect to said second load support section and both track sections are adjustably mounted with relation to the two runs of the endless member, said first and second load support sections extending to said second and first arcuate sections, respectively, and each having a second inclined portion at its end extending to said respective arcuate sections, each set of said cooperating drive and idler cams withdrawing their associated tooth-like projections from bearing contact with the teeth of the groove of said endless member in which said cooperating cams are positioned when the separation distance between the bearing surfaces of said cooperating cams is decreased to less than said second magnitude during engagement of the associated clamping guide roller with said second inclined portions, said tooth-like projections being withdrawn from the respective groove by the travel of said endless drive chain on its circular path around the sprocket adjacent said second inclined portions.

11. A drive unit according to claim 10, wherein said clamping guide rollers are provided with polyurethane tires.

12. A drive unit according to claim 8, wherein each said guide unit includes a pair of clamping guide rollers rotatably mounted on each said drive cam, each said clamping guide roller having a polyurethane tire maintained in continuous rolling engagement with said endless track.

13. A drive unit according to claim 12, wherein each drive cam and its cooperating idler cam includes a toothed sector of a spur gear, each in mating engagement with the other whereby each idler cam is pivoted on its driving chain link pin when its associated drive cam is pivoted on its driving chain link pin.

14. A drive unit according to claim 13 wherein said second bearing element includes a separate resilient member connecting each drive cam and its cooperating idler cam, each resilient member urging its associated clamping guide rollers into continuous rolling engagement with said endless track.

15. A drive unit according to claim 12, wherein said endless driving chain includes a drive cam pivotally mounted on one of said driving chain link pins, said drive cam having a first tooth-like projection with a first bearing surface and a toothed sector of a spur gear, and wherein said endless driving chain includes a cooperating idler cam mounted on a driving chain link pin adjacent the driving chain link pin on which said drive cam is mounted, each idler cam having a second tooth-like projection extending outwardly from said driving chain, said second tooth-like projection having a second bearing surface disposed in an opposed relationship to said first bearing surface, said opposed bearing surfaces having a variable separation distance between them and each idler cam having a toothed sector of a spur gear, each said drive cam toothed sector being in mating engagement with its cooperating idler cam toothed sector for pivoting said idler cam on its associated driving chain link pin when said drive cam is pivoted on its associated driving chain link pin thereby varying the separation distance between said opposed bearing surfaces, said clamping guide roller continuously engaging said endless track section positioning said drive cam and its associated cooperating idler cam tooth-like projections to be inserted into a groove of said endless member and urging their associated bearing surfaces into bearing against the two teeth defining said groove in said endless member in which said tooth-like projections are inserted.

* * * * *